US007239687B1

(12) United States Patent
Olofsson et al.

(10) Patent No.: US 7,239,687 B1
(45) Date of Patent: Jul. 3, 2007

(54) TELECOMMUNICATIONS

(75) Inventors: Sven-Rune Olofsson, Lulea (SE); Lennart Olsson, Lulea (SE); Joachim Johansson, Lulea (SE); Hans Ohman, Lulea (SE); Mikael Isaksson, Lulea (SE); Magnus Johansson, Lulea (SE); Tomas Stefansson, Boden (SE); Gunnar Bahlenberg, Lulea (SE); Anders Isaksson, Lulea (SE); Goran Okvist, Lulea (SE); Lis-Marie Ljunggren, Lulea (SE); Daniel Bengtsson, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/582,637

(22) PCT Filed: Jan. 28, 1999

(86) PCT No.: PCT/SE99/00121

§ 371 (c)(1), (2), (4) Date: Oct. 20, 2000

(87) PCT Pub. No.: WO99/39498

PCT Pub. Date: Aug. 5, 1999

(30) Foreign Application Priority Data

Jan. 29, 1998 (SE) .................................. 9800249

(51) Int. Cl.
*H04M 1/24* (2006.01)
*H04M 3/08* (2006.01)
*H04M 3/22* (2006.01)

(52) U.S. Cl. .................... 379/29.01; 379/1.04; 379/24; 379/27.01; 379/27.07

(58) Field of Classification Search ............... 379/1.01, 379/29.01, 1.03, 27.01, 27.03, 1.04, 21, 22.02, 379/22.04, 24, 26.01, 28, 23, 27.07
See application file for complete search history.

(56) References Cited

U.S. PATENT DOCUMENTS 4,862,491 A * 8/1989 LaSalle et al. ................. 379/6
5,003,586 A * 3/1991 Wright ....................... 379/399
5,073,919 A 12/1991 Hagensick
5,195,124 A * 3/1993 Ishioka ........................ 379/27

(Continued)

FOREIGN PATENT DOCUMENTS

EP 0 338 654 10/1989

(Continued)

*Primary Examiner*—Binh K. Tieu
(74) *Attorney, Agent, or Firm*—Lisa K. Jorgenson; Allen, Dyer, Doppelt, Milbrath & Gilchrist, P.A.

(57) ABSTRACT

When delivering a broadband service, such as xDSL, without inband POTS, it is necessary to separate the analogue POTS signal and the xDSL signal from each other at both the CO (Central Office) and the CP (Customer's Premises). This can be achieved by using an active POTS splitter. The present invention incorporates test functionality for the line between the CP and the CO, or ONU (Optical Network Unit), in the POTS splitter. This enables two-sided measurements on the line, both during installation and during operation. The measurements are performed at the CO and upon request, or when the test device automatically sends a test message/signal. In this way there is no need for field technicians at the CP side. The POTS splitter can have a unique identity code that is transmitted to the CO each time a test is started, or on receipt of a request from the CO.

28 Claims, 1 Drawing Sheet

U.S. PATENT DOCUMENTS 5,224,149 A * 6/1993 Garcia ........................... 379/5
5,353,327 A * 10/1994 Adari et al. .................. 379/24
5,357,556 A * 10/1994 Dresser ....................... 379/27
5,402,073 A * 3/1995 Ross .......................... 324/539
5,668,857 A 9/1997 McHale
5,799,060 A * 8/1998 Kennedy et al. ......... 379/29.01
5,870,451 A * 2/1999 Winkler et al. ............... 379/26
5,946,372 A * 8/1999 Jones et al. .................... 379/1
5,974,115 A * 10/1999 Chan et al. ................... 379/27
6,002,671 A * 12/1999 Kahkoska et al. .......... 370/248
6,005,921 A * 12/1999 Keefe et al. ............. 379/27.01
6,014,425 A * 1/2000 Bingel et al. ................. 379/27
6,091,713 A * 7/2000 Lechleider et al. ........... 379/27
6,111,936 A * 8/2000 Bremer ........................ 379/28
6,154,524 A * 11/2000 Bremer ........................ 379/27
6,177,801 B1 * 1/2001 Chong ........................... 379/6
6,181,775 B1 * 1/2001 Bella ........................... 379/29
6,192,109 B1 * 2/2001 Amrany et al. ............... 379/30
6,205,202 B1 * 3/2001 Yoshida et al. ............... 379/27
6,212,258 B1 * 4/2001 Bella et al. ................... 379/29
6,215,855 B1 * 4/2001 Schneider .................... 379/22
6,259,676 B1 * 7/2001 Kellock et al. ............. 370/248
6,278,769 B1 * 8/2001 Bella ....................... 379/29.11
6,301,337 B1 * 10/2001 Scholtz et al. ................ 379/30
6,442,195 B1 * 8/2002 Liu et al. .................... 375/220
7,006,445 B1 * 2/2006 Cole et al. .................. 370/247

FOREIGN PATENT DOCUMENTS

EP 0 677 938 10/1995
EP 0 795 977 9/1997
GB 2 176 970 1/1987
WO WO 97/20396 6/1997

* cited by examiner

TELECOMMUNICATIONS

FIELD OF THE INVENTION

The present invention relates to: a POTS splitter, for separating analog telephony signals from line testing device; a telecommunications system, incorporating POTS splitters including line testing devices, at customer premises; and a method of testing a subscriber's line.

BACKGROUND OF THE INVENTION

A network operator who wishes to introduce a broadband service, for instance xDSL (Digital Subscriber line), must be able to measure certain parameters for a wire pair that is to be used to deliver the service. This is necessary both to ensure that the service can be successfully provided and to enable the network operator to guarantee service quality. There are many advantages if the measurements can be performed on a two sided basis. This means that a signal source capable of transmitting test messages/signals, upon request, must be placed at the customer's end of the line. The results of applying a test message/signal to the line at the customer's end are measured at the CO (Central Office) end. The present invention provides an active POTS splitter ("Plain Old Telephony Service" splitter) which includes this testing functionality.

When delivering a broadband service, such as xDSL, without inband POTS, it is necessary to separate the analog POTS signal and the xDSL signal from each other at both the CO (Central Office) and the CP (Customer's Premises). This can be achieved by using analog passive high pass and low pass fitters. FIG. 1, the accompanying drawing, illustrates this principle.

However, a passive POTS splitter design lacks the performance of an active splitter design, see J. Cook and P. Sheppard, "ADSL and VADSL Splitter Design and Telephony Performance", p. 1634, December 1995, IEEE Journal on Selected Areas in Communications, ISSN 07-8716. This results in either: poorer POTS transmission; or if the cutoff frequency of the low pass filter in the splitter is increased, a waste of valuable spectrum that could otherwise be used to support higher data rates in the xDSL modem.

If an active POTS splitter design, with impedance matched circuits, is used, the filter design criteria become more reasonable while, at the same time, the spectrum, or bandwidth, use becomes more efficient, without degradation in the ordinary telephony transmission. The preferred solutions, especially as xDSL becomes, more common, is the active POTS splitter design, or inband POTS (which implements the telephony service as a part of the xDSL data stream).

If the active splitter design is used and the splitter is implemented on a single chip, the present invention proposes the incorporation of test functionality for the line between the CP and the CO, or ONU (Optical Network Unit), on this chip. This enables two-sided measurements on the line, both during installation and during operation. The measurements are performed at the CO end upon request, or when the test device automatically sends a test message signal. In this way there will be no need for field technicians at the CP side. If necessary, these chips can have a unique identity code that is transmitted to the CO each time a test is started, or on receipt of a request from the CO.

The test messages/signals should either be specially designed for a certain measurement case, or general applicable signals which can be used with a range of tests, e.g. pulses, steps, or chirps, to estimate the transfer function of the line. One example of a parameter requiring two-sided measurement is attenuation. The test sequence could, in this case, be a series of sinusoidal signals, with known amplitudes, sent from the test device to the CO, in sequence. The sequence can, for example, comprise 10, 100, or any other number, of tones, starting from either low, or high frequency and then varying in frequency towards the other side of the frequency spectrum. Each tone is transmitted for a relatively long period of time, so that synchronization is not a problem and so that the measurement can be performed within the duration of a tone. The start of a test may occur at a predetermined time interval after a test message request.

SUMMARY OF THE INVENTION

According to a first aspect of the present invention, there is provided an active POTS splitter adapted to separate analog POTS signals from xDSL signals, wherein the active POTS splitter includes line testing means.

The testing means may be adapted to transmit a test signal, or test message, to a line to be tested. The test signal may be adapted for the performance of a specific line test. Alternatively, the test signal may be of a general form capable of use with a range of different line tests. The test signal may comprise at least one pulse. The test signal may comprise at least one step. The test signal may comprise at least one chirp.

The test signal may comprise a series of sinusoidal signals of known amplitude, each signal in the series having a different frequency, the series spanning a frequency range for which a line is to be tested. Each tone of the series of sinusoidal signals may have a duration of a length sufficient to avoid problems associated with synchronization and to permit a measurement to be completed within the duration.

The test means may be adapted to transmit the test signal, or message, on receipt of a request signal. A test facilitated by the test means may be initiated at a predetermined time interval after receipt of a request signal by the test means. The test means may be adapted to transmit the test signal, or message, automatically. The test means may be adapted to transmit said test signal, or message, in accordance with a predetermined schedule.

The test means may have a unique identity code, and the test means may be adapted to transmit said unique identity code whenever a test signal, or message, is transmitted, or whenever an identification request signal is received. The test means may be adapted to short-circuit a line.

The active POTS splitter, including the test means, may be implemented as a single chip. The chip may be mounted on a PCB connected to a line jack adapted for direct insertion into a customer premises line socket.

According to a second aspect of the present invention, there is provided, in a telecommunications system adapted to employ xDSL and POTS, and comprising at least one central office connected to a plurality of subscribers by subscriber lines, a method of measuring quality parameters relating to xDSL transmission on a subscriber line, including the steps of: generating a test signal on the subscriber line at a subscriber's premises; performing measurements at the central station on the test signal as received at the central station; and deriving quality parameters for the subscriber line from the measurements.

The test signal may be generated by causing the subscriber line to change form a high impedance state to a low impedance state. The test signal may be generated by causing a telephone to switch from an "on-hook" state to an "off-hook" state.

According to a third aspect of the present invention, there is provided, in a telecommunications system adapted to employ xDSL and POTS, and comprising at least one central office connected to a plurality of subscribers by subscriber lines, each subscriber premises being equipped with a POTS splitter, a method of measuring quality parameters relating to xDSL transmission on a subscriber line, including the steps of: the POTS splitter generating a test signal on the subscriber line; performing measurements at the central station on the test signal as received at the central station; and deriving quality parameters for the subscriber line from the measurements.

Said test signal may be adapted for the performance of a specific line test. The test signal may be of a general form capable of use with a range of different line tests. The test signal may comprise at least one pulse. The test signal may comprise at least one step. The test signal may comprise at least one chirp.

The test signal may comprise a series of sinusoidal signals of known amplitude, each signal in the series having a different frequency, the series spanning a frequency range for which a line is to be tested. Each tone of the series of sinusoidal signals may have a duration of a length sufficient to avoid problems associated with synchronization and to permit a measurement to be completed within the duration.

The test signal, or message, may be transmitted on receipt of a request signal. A test may be initiated at a predetermined time interval after receipt of a request signal. The test signal, or message, may be transmitted automatically. The test signal or message may be transmitted in accordance with a predetermined schedule.

Each POTS splitter may have a unique identity code, and the unique identity code may be transmitted whenever a test signal, or message, is transmitted, or whenever an identification request signal is received. The test signal may be generated by short-circuiting a line. Results obtained from line tests may be collected and stored at the central office and a log of line condition for each subscriber line may be derived therefrom. A plurality of results obtained from line tests may be collected and stored at the central office and the plurality of results may be averaged to obtain a composite result for each subscriber line.

According to a fourth aspect of the present invention, there is provided a telecommunications system adapted to employ POTS and xDSL, comprising at least one central office connected to a plurality of subscriber premises by subscriber lines, at least some of the subscriber premises having a POTS splitter located therein, wherein the POTS splitter is a POTS splatter as set forth in any preceding paragraph.

According to a fifth aspect of the present invention, there is provided a telecommunications system adapted to employ POTS and xDSL, comprising at least one central office connected to a plurality of subscriber premises by subscriber lines, at least some of the subscriber premises having a POTS splitter located therein, wherein the POTS spotter is adapted to measure subscriber line quality in accordance with a method as set forth in any preceding paragraph.

BRIEF DESCRIPTION OF THE DRAWINGS

Embodiments of the invention will now be described, by way of example, with reference to the accompanying drawing, in which.

DETAILED DESCRIPTION OF THE PREFERRED EMBODIMENTS

Figure 1:
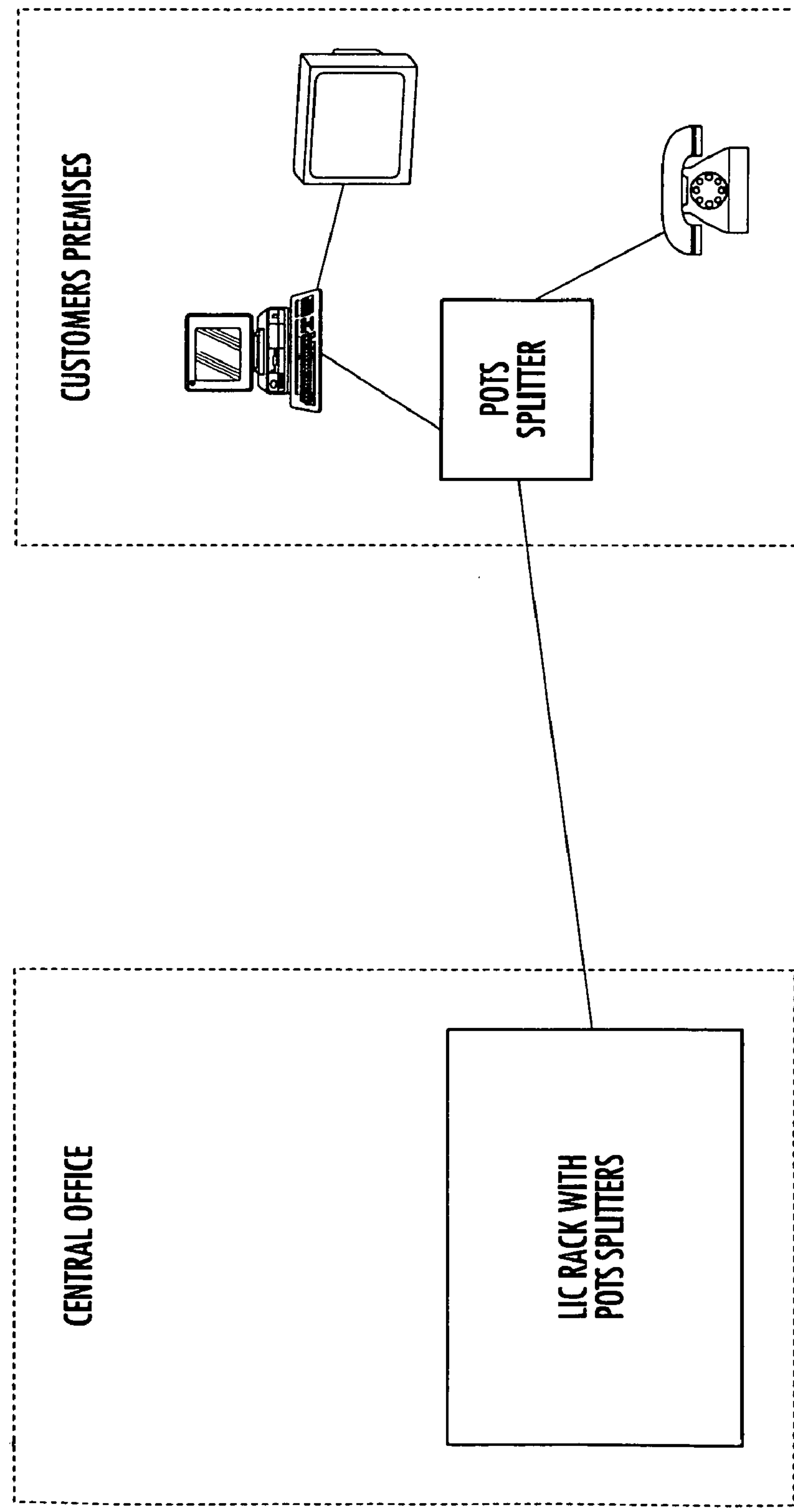
FIG. 1 illustrates an overview of the way POTS splitters are located in an xDSL system.

As previously explained, when delivering a broadband service such as xDSL, without inband POTS, it is necessary to separate the analog POTS signal and the xDSL signal from each other at both the CO (Central Office) and the CP (Customers Premises). This can be done with analog passive high pass and low pass filters and is illustrated in schematic form in FIG. 1 which shows an overview of the principle. Referring briefly to FIG. 1, it will be seen that the CO has a rack of LICs (Line Interface Cards) which include POTS splitters for separating analogue telephony signals and xDSL signals received from subscribers. At the subscriber end, there is a POTS splitter which separates analog telephone signals and xDSL signals received from the CO. This scheme is equally applicable to passive and active POTS splitters.

Unfortunately, passive POTS splatters lack the performance of active splitters. This results either in: degradation of transmission; or loss of xDSL spectrum. The use of an active POTS splitter with impedance matched circuits gives more reasonable filter design criteria and more efficient use of xDSL spectrum.

The present invention proposes to capitalize on the advantages of active splitters by incorporating test functionality, for the line between the CP and the CO, or ONU (Optical Network Unit), in the POTS splitter and, preferably, implementing both the POTS splitter and test functionality in a single chip. This enables two-sided measurements on the line to be performed both during installation and operation. These measurements can be performed from the CO end either on request, or when the test device automatically sends a test message/signal. This avoids the need for field technicians at the CP side when line measurements are performed. The chip can be provided with a unique identity code that can be transmitted to the CO whenever a test is performed, or requested. The identity code can be associated with test data thus enabling a line to which the test data relates to be uniquely identified.

The test messages/signals are either specially designed for a certain measurement case or, alternatively, general test messages/signals such as pulses, steps, or chirps, that can be used to estimate the transfer function of the line. A parameter that demands two-sided measurement is attenuation. The test sequence can, in this case, be a series of sinusoidal signals, with known amplitude, sent from the test device to the CO in sequence. The sequence can, for example, comprise 10, or 100, or any other number of tones, starting from either low, of high, frequency and then going towards the other side of the frequency spectrum.

Each tone is sent out for a relatively long period of time, so that synchronization is not a problem. This also guarantees that the measurement is completed within the duration of a tone. The test commences at a predetermined time interval after receipt of a test message request.

Another valuable facility that can be provided by the test device is the ability to open, or short-circuit, the line at the CP side on request from the CO. This enables the well known open, or short-circuit measurement method, see SR Olofsson, Anders Isaksson & Joachim Johansson, "MEASUREMENT METHODS FOR WIRE PAIRS 1N THE ACCESS NETWORK", 7/0363/2/FCPA 1.0090013, 97-10-20, to be performed.

It is also possible to let the POTS splitter, located at the CP, generate a test signal every time the customer picks up the receiver, i.e. the telephone instrument changes from an "on-hook" state to an "off-hook" state. Measurements are performed on these signals at the CO and the results of the measurements accumulated, to this case the test signal can, for example, be a step, pulse, or even a chirp. It may even be possible to carry out these measurements without the test device by using the step signal that is generated whenever a telephone goes from an "on-hook" high impedance state to an "off-hook" low impedance state. However, if this method is to be used, care must, of course, be taken to handle the contact bounces that are generated. The central concept behind the invention is still to generate numerous test messages and to save the results at the CO.

Another possibility is to program the active POTS splitter to send certain test messages in accordance with a predetermined schedule. At the CO side the LICs (Line Interface Cards) must have the functionality needed to measure and process the generated "on/off-hook" signal. If many such signals are collected and saved over a long period of time, the result can be used as a log of the line condition. A result calculated from a large set of accumulated data, i.e. many hook lifts, will naturally have higher precision than a result based on a single measurement.

In a typical application of the present invention, a customer calls Telia's Customers Services Department, CSD, and requests that he/she be provided with Telia's newly announced "Superinternet Service" i.e. Telia's xDSL-service. The CSD tells the customer that they want to send him/her a test device, in other words, the active POTS splitter with line testing functionality, to check the quality of the sine. When the customer receives the POTS splitter, he/she can install it simply by inserting it in the telephony jack socket. It is then possible to perform measurements on the line from the CO. The results of these measurements can then be promptly sent to the customer. It may then be possible to deliver the service from the next day or, alternatively, some minor, or major, changes may have to be made to the network before the customer can be provided with the requested service. The test device and POTS spotter, of the present invention can be produced very cheaply because of chip integration. This means that it is not necessary to retrieve the test device and POTS splitter, from the customer, if the line quality is insufficient for the provision of an xDSL service.

POTS splitters that separate the analogue POTS signal and the xDSL signal from each other are, advantageously, alive, because of the inadequate performance of passive designs. Active POTS splitter can be realized on a single chip, so that a POTS splitter solution only requires one IC on a simple circuit board. At very little additional cost it is possible to implement testing functionality on this chip. With this functionality it is possible to send test messages from the test device/POTS splitter at the CP, upon receipt of a request from the CO end. At the CO end, measurements of the line quality can then be performed. When a customer asks for an xDSL, or other copper line based broad band service, the test device/POTS splitter can be sent to the customer's home and the customer can then install the POTS splitter test device himself. The test device/POTS splitter is a low cost device which means that it can be sent to customers free of charge and customers can be allowed to keep these devices even if measurements performed indicated that it is not possible to install any broad band service. It is also possible to automatically, generate test signals from the test device/POTS spotter, e.g. on every "hook lift", in order to get large numbers of test results that are accumulated at the CO side, possibly on modified Line Interface Cards, thus yielding better estimates of the line condition.

The invention claimed is:

1. An active POTS splitter for use in a telecommunications system using xDSL and POTS and including at least one central office connected to a plurality of subscribers by subscriber lines extending to each subscriber's premises, the active POTS splitter comprising:

an integrated circuit (IC) chip including active splitter circuitry to be connected to a subscriber line, at the subscriber's premises, for separating analog POTS signals from xDSL signals, and line test circuitry associated with said active splitter circuitry for transmitting, at the subscriber's premises, a test signal for measuring quality parameters relating to xDSL transmission on the subscriber line, said line test circuitry transmitting the test signal based upon at least one of an event and receipt of a test request signal, said line test circuitry having associated therewith a unique identity code transmitted with the test signal;

a printed circuit board mounting said IC chip; and a line jack connected to said printed circuit board for insertion into a customer premises line socket.

2. An active POTS splitter according to claim 1 wherein the test signal is for a specific line test.

3. An active POTS splitter according to claim 1 wherein the test signal is in a general form for use with a range of different line tests.

4. An active POTS splitter according to claim 1 wherein the test signal comprises at least one pulse.

5. An active POTS splitter according to claim 1 wherein the test signal comprises at least one step.

6. An active POTS splitter according to claim 1 wherein the test signal comprises at least one chirp.

7. An active POTS splitter according to claim 1 wherein the test signal comprises a series of sinusoidal signals of predetermined amplitude, each sinusoidal signal having a different frequency and the series thereof spanning a frequency range for which the line is to be tested.

8. An active POTS splitter according to claim 7 wherein each sinusoidal signal has a predetermined duration to facilitate synchronization and measurement.

9. An active POTS splitter according to claim 1 wherein the event is according to a predetermined schedule.

10. An active POTS splitter according to claim 1 wherein the line test signal comprises a short-circuiting of the subscriber line.

11. In a telecommunications system using xDSL and POTS and comprising at least one central office connected to a plurality of subscribers by subscriber lines extending to each subscriber's premises, a method of measuring quality parameters relating to xDSL transmission on a subscriber line and comprising:

using an active POTS splitter comprising an integrated circuit (IC) chip including active splitter circuitry for separating analog POTS signals from xDSL signals and including line test circuitry for generating a test signal on the subscriber line from a subscriber's premises based upon at least one of an event and receipt of a test request signal, and transmitting a unique identity code with the test signal, a printed circuit board mounting the IC chip, and a line jack connected to the printed circuit board for insertion into a customer premises line socket;

performing measurements at the at least one central office on the test signal; and deriving quality parameters for the subscriber line from the measurements.

12. A method according to claim 11 wherein the event comprises the subscriber line changing from a high impedance state to a low impedance state.

13. A method as claimed in claim 11 wherein the event comprises a telephone switching from an on-hook state to an off-hook state.

14. A method according to claim 11 wherein the event comprises a predetermined schedule.

15. In a telecommunications system using xDSL and POTS and comprising at least one central office connected to a plurality of subscribers by subscriber lines extending to each subscriber's premises, a method of measuring quality parameters relating to xDSL transmission on a subscriber line and comprising:

using an active POTS splitter comprising an integrated circuit (IC) chip including active splitter circuitry for separating analog POTS signals from xDSL signals and including line test circuitry for generating a test signal on the subscriber line from a subscriber's premises based upon receipt of a test request signal, and for transmitting a unique identity code based upon at least one of receipt of a test request signal and receipt of an identification request signal, a printed circuit board mounting the IC chip, and a line jack connected to the printed circuit board for insertion into a customer premises line socket;

performing measurements at the at least one central office on the test signal; and deriving quality parameters for the subscriber line from the measurements.

16. A method according to claim 15 wherein the test signal is for performance of a specific line test.

17. A method according to claim 15 wherein the test signal is of a general form for use with a range of different line tests.

18. A method according to claim 15 wherein the test signal comprises at least one pulse.

19. A method according to claim 15 wherein the test signal comprises at least one step.

20. A method according to claim 15 wherein the test signal comprises at least one chirp.

21. A method according to claim 15 wherein the test signal comprises a series of sinusoidal signals of predetermined amplitude, each sinusoidal signal having a different frequency and the series thereof spanning a frequency range for which the line is to be tested.

22. A method according to claim 21 wherein each sinusoidal signal has a predetermined duration to facilitate synchronization and measurement.

23. A method according to claim 15 wherein the test signal is transmitted a predetermined time after receiving the test request signal.

24. A method according to claim 15 further comprising transmitting the unique identity code based upon receiving an identification request signal.

25. A method according to claim 15 wherein the event comprises short-circuiting of the subscriber line.

26. A method according to claim 15 further comprising collecting and storing results obtained from line tests at the at least one central office and deriving a log of line conditions for each subscriber line therefrom.

27. A method according to claim 15 further comprising collecting and storing a plurality of results obtained from line tests at the at least one central office and averaging the plurality of results to obtain a composite result for each subscriber line.

28. A telecommunications system using POTS and xDSL, comprising at least one central office connected to a plurality of subscriber premises by subscriber lines extending to respective subscriber premises, at least at least one of the subscriber premises having an active POTS splitter located therein, the active POTS splitter comprising:

an integrated circuit (IC) chip including active splitter circuitry to be connected to a subscriber line, at the subscriber's premises, for separating analog POTS signals from xDSL signals, and line test circuitry associated with said active splitter circuitry for transmitting, at the subscriber's premises, a test signal for measuring quality parameters relating to xDSL transmission on the subscriber line, said line test circuitry transmitting the test signal based upon at least one of an event and receipt of a test request signal, said line test circuitry having associated therewith a unique identity code transmitted with the test signal;

a printed circuit board mounting the IC chip, and a line jack connected to the printed circuit board for insertion into a customer premises line socket.

* * * * *

UNITED STATES PATENT AND TRADEMARK OFFICE

CERTIFICATE OF CORRECTION

PATENT NO. : 7,239,687 B1
APPLICATION NO. : 09/582637
DATED : July 3, 2007
INVENTOR(S) : Olofsson et al.

It is certified that error appears in the above-identified patent and that said Letters Patent is hereby corrected as shown below:

Column 8, Line 28 Delete: “at least at least”
Insert -- at least--

Signed and Sealed this

Thirteenth Day of November, 2007

JON W. DUDAS
*Director of the United States Patent and Trademark Office*